(12) United States Patent
Wei et al.

(10) Patent No.: US 12,474,277 B2
(45) Date of Patent: Nov. 18, 2025

(54) METHOD FOR DETERMINING TYPES OF DEFECTS IN MONOCRYSTALLINE SILICON WAFER

(71) Applicant: ZING SEMICONDUCTOR CORPORATION, Shanghai (CN)

(72) Inventors: Xing Wei, Shanghai (CN); Hao Wang, Shanghai (CN); Minghao Li, Shanghai (CN); Yuehui Yu, Shanghai (CN)

(73) Assignee: ZING SEMICONDUCTOR CORPORATION, Shanghai (CN)

( * ) Notice: Subject to any disclaimer, the term of this patent is extended or adjusted under 35 U.S.C. 154(b) by 191 days.

(21) Appl. No.: 18/528,402

(22) Filed: Dec. 4, 2023

(65) Prior Publication Data
US 2024/0183797 A1    Jun. 6, 2024

(30) Foreign Application Priority Data
Dec. 5, 2022   (CN) .......................... 202211550971.4

(51) Int. Cl.
*G01N 21/95*  (2006.01)
*G01N 21/49*  (2006.01)

(52) U.S. Cl.
CPC ......... *G01N 21/9505* (2013.01); *G01N 21/49* (2013.01)

(58) Field of Classification Search
CPC .... G01N 21/49; G01N 21/88; G01N 21/9505; C30B 15/00; C30B 15/14
See application file for complete search history.

(56) References Cited

U.S. PATENT DOCUMENTS

| 8,574,362 B2 * | 11/2013 | Hong | C30B 15/206 |
| | | | 117/34 |
| 2014/0125374 A1 * | 5/2014 | Ham | H01L 22/12 |
| | | | 324/762.05 |

* cited by examiner

*Primary Examiner* — Kevin K Pyo
(74) *Attorney, Agent, or Firm* — MUNCY, GEISSLER, OLDS & LOWE, P.C.

(57) ABSTRACT

The present invention provides a method for determining the type of defects in a monocrystalline silicon wafer, which includes the steps of: using LST to measure particles in an as-grown silicon wafer and thereby obtaining a first measurement, and determining a V-rich region based on the first measurement and a first preset density value; and subjecting the silicon wafer to a thermal treatment, again using LST to measure particles in the silicon wafer and thereby obtaining a second measurement, and determining a Pv region, an I-rich region and a Pi region based on the second measurement, a second preset density value and a third preset density value. As a result, a particle density can be utilized as a basis for accurately and efficiently determining a region of interest of a monocrystalline silicon wafer as one of a V-rich region, a Pv region, a Pi region and an I-rich region.

10 Claims, 2 Drawing Sheets

METHOD FOR DETERMINING TYPES OF DEFECTS IN MONOCRYSTALLINE SILICON WAFER

CROSS-REFERENCE TO RELATED APPLICATION

This application claims the priority of Chinese patent application number 202211550971.4, filed on Dec. 5, 2022, the entire contents of which are incorporated herein by reference.

TECHNICAL FIELD

The present invention relates to the technical field of semiconductor and, in particular, to a method for determining the type of defects in a monocrystalline silicon wafer.

BACKGROUND

A Czochralski process for manufacturing monocrystalline silicon may involve heating and melting polycrystalline silicon as a starting material in a quartz crucible and dipping a seed crystal into the molten silicon. The seed crystal may be then pulled upwards while being rotated, allowing solidification and crystallization of the pulled molten silicon at its interface with the seed crystal into a monocrystalline silicon ingot. Monocrystalline silicon grown by the Czochralski method may have grown-in defects, the formation of which is affected by the rate of pulling and thermal field distribution during the crystal growth process. Depending on pulling conditions for enabling crystallization, the distribution of such grown-in defects can be divided into V-rich, OISF, Pv, Pi and I-rich regions arranged in sequence from the fast to slow growth side, as shown in FIG. 3. The V-rich region contains a relatively large number of voids forming around the fast growth side as a result of insufficient silicon atoms. The I-rich region is rich of dislocations and silicon atom clusters occurring due to the presence of excessive self-interstitial silicon atoms around the slow growth side. The OISF region has defects known as oxidation induced stacking faults (OISFs) and is ring-shaped when viewed in a cross section perpendicular to the axis of crystal growth (parallel to surfaces of wafers to be sliced from the ingot).

The Pv and Pi regions are defect-free regions ideal for the manufacture of silicon wafers, which together define a nearly perfect crystal (NPS) without void or large etch pit (LEP) defects. Therefore, there is an increasing demand for NPS silicon wafer. Thus, it is important to detect the presence of, and characterize the types of, defects in silicon wafers.

At present, common methods for detecting defects in silicon wafers include localized light scattering (LLS) scanning, which may be combined with vapor etching to detect and identify grown-in defects. However, before a vapor etching process can be performed, a silicon wafer to be tested must have a sufficient degree of surface cleanness, necessitating a series of pre-treatment steps including polishing, cleaning and etching. Laser scattering tomography (LST) can also be used for defect assessment. This technique relies on measuring bulk micro-defects (BMDs) (consisting essentially of measuring the density and size of oxygen precipitates therein). However, the growth of oxygen precipitates in such BMDs typically requires two heat treatment steps respectively involving heating at 800° C. for 4 h and heating at 1000° C. for 16 h. Therefore, it is time-consuming and would increase process cost.

In summary, in the existing defect detection methods, region classification for defect assessment imposes stringent requirements on silicon wafers to be tested, involves a complex process, and is time-consuming and costly.

SUMMARY OF THE DISCLOSURE

It is an object of the present invention to provide a method for determining the type of defects in a monocrystalline silicon wafer, which can overcome the problem of strict requirements being imposed on silicon wafers to be tested for region classification for defect assessment in existing defect detection methods.

The above object is achieved by the present invention which provides a method for determining the type of defects in a monocrystalline silicon wafer, comprising:
  measuring particles in an as-grown silicon wafer by using LST to obtain a first measurement, and determining a V-rich region based on the first measurement and a first preset density value; and
  subjecting the silicon wafer to a thermal treatment, measuring particles in the silicon wafer by using LST again to obtain a second measurement, and determining a Pv region, an I-rich region and a Pi region based on the second measurement, a second preset density value and a third preset density value.

Optionally, the first measurement may comprise a particle density, wherein determining the V-rich region based on the first measurement and the first preset density value comprises:
  determining a region, for which the particle density of the first measurement is higher than the first preset density value, as the V-rich region.

Optionally, the silicon wafer has an oxygen content of 5 ppma to 20 ppma, and the thermal treatment that the silicon wafer is subjected to may be performed in an argon atmosphere at a temperature of 800° C. to 1000° C. for 2 hours to 4 hours.

Optionally, the second measurement may comprise a particle density, wherein determining the Pv region, an I-rich region and a Pi region based on the second measurement, the second preset density value and the third preset density value comprises:
  determining a region, for which the particle density of the second measurement is higher than the second preset density value, as the Pv region;
  determining a region, for which the particle density of the second measurement lies between the second and third preset density values, as the I-rich region; and
  determining a region, for which the particle density of the second measurement is lower than the third preset density value, as the Pi region.

Optionally, the first preset density value may be in a range of $2\times10^6$ cm$^{-3}$ to $10^7$ cm$^{-3}$, the second preset density value of $4\times10^6$ cm$^{-3}$ to $4\times10^7$ cm$^{-3}$ and the third preset density value of $5\times 10^5$ cm$^{-3}$ to $3\times10^6$ cm$^{-3}$.

In another aspect, the present invention provides another method for determining the type of defects in a monocrystalline silicon wafer, which comprises the steps of:
  measuring particles in an as-grown silicon wafer by LST to obtain a third measurement, and determining a V-rich region based on a first preset size, a fourth preset density value and the third measurement; and
  subjecting the silicon wafer to a thermal treatment, measuring particles in the silicon wafer by using LST again to obtain a fourth measurement, and determining a Pv region, an I-rich region and a Pi region based on the fourth measurement, a second preset size, a fifth preset density value and a sixth preset density value.

Optionally, the third measurement may comprise a particle density and a particle size, wherein determining the V-rich region based on the first preset size, the fourth preset density value and the third measurement comprises:

determining a region, for which the particle density of the third measurement is higher than the fourth preset density value and the particle size of the third measurement is greater than the first preset size, as the V-rich region.

Optionally, the silicon wafer has an oxygen content of 5 ppma to 20 ppma, and the thermal treatment that the silicon wafer is subjected to may be performed in an argon atmosphere at a temperature of 800° ° C. to 1000° C. for 2 hours to 4 hours.

Optionally, the fourth measurement may comprise a particle density and a particle size, wherein determining the Pv region, an I-rich region and a Pi region based on the fourth measurement, the second preset size, the fifth preset density value and the sixth preset density value comprises:

determining a region, for which the particle density of the fourth measurement is higher than the fifth preset density value, as the Pv region;

determining a region, for which the particle density of the fourth measurement lies between the fifth and sixth preset density values and the particle size of the fourth measurement is greater than the second preset size, as the I-rich region; and determining a region, for which the particle density of the fourth measurement is lower than the sixth preset density value and the particle size of the fourth measurement is greater than the second preset size, as the Pi region.

Optionally, the first preset size may range from 20 nm to 25 nm, the second preset size from 30 nm to 40 nm, the fourth preset density value from $5 \times 10^5$ cm$^{-3}$ to $5 \times 10^6$ cm 3, the fifth preset density value from $4 \times 10^7$ cm$^{-3}$ to $10^8$ cm$^{-3}$, and the sixth preset density value from 0 to $4 \times 10^6$ cm$^{-3}$.

Compared with the prior art, the present invention offers the benefits as follows:

1. An LST measurement is used in view of a particle density, or both a particle density and a particle size, as a basis for accurately and efficiently determining a region of interest of a monocrystalline silicon wafer as one of a V-rich region, a Pv region, a Pi region and an I-rich region, making the method advantageous in clear distinguishability, high robustness and high repeatability and thereby lowering the requirements imposed on the silicon wafer for region classification for defect assessment.

2. The combined use of the time-saving thermal treatment with LST can provide the advantage of efficient and less costly characterization of defects in a silicon wafer. In particular, the time-saving thermal treatment can significantly reduce the time required for thermally treating the silicon wafer and reduce process complexity and cost.

DETAILED DESCRIPTION

The method for determining the type of defects in a monocrystalline silicon wafer proposed in the present invention will be described in greater detail below. The invention will be described in greater detail below with reference to the accompanying drawings, which present preferred embodiments of the invention. It would be appreciated that those skilled in the art can make changes to the invention disclosed herein while still obtaining the beneficial results thereof. Therefore, the following description shall be construed as being intended to be widely known by those skilled in the art rather than as limiting the invention.

For the sake of clarity, not all features of actual implementations are described. In the following, description and details of well-known functions and structures are omitted to avoid unnecessarily obscuring the invention. It should be appreciated that in the development of any such actual implementation, numerous implementation-specific decisions must be made to achieve specific goals of the developers, such as compliance with system-related and business-related constrains, which may vary from one implementation to another. Moreover, it should be appreciated that such a development effort might be complex and time consuming, but would nevertheless be a routine undertaking for those of ordinary skill in the art.

Objects and features of the present invention will become more apparent upon reading the following more detailed description of particular embodiments thereof with reference to the accompanying drawings. Note that the figures are provided in a very simplified form not necessarily drawn to exact scale and for the only purpose of facilitating easy and clear description of the disclosed embodiments.

Embodiment 1

Figure 1:
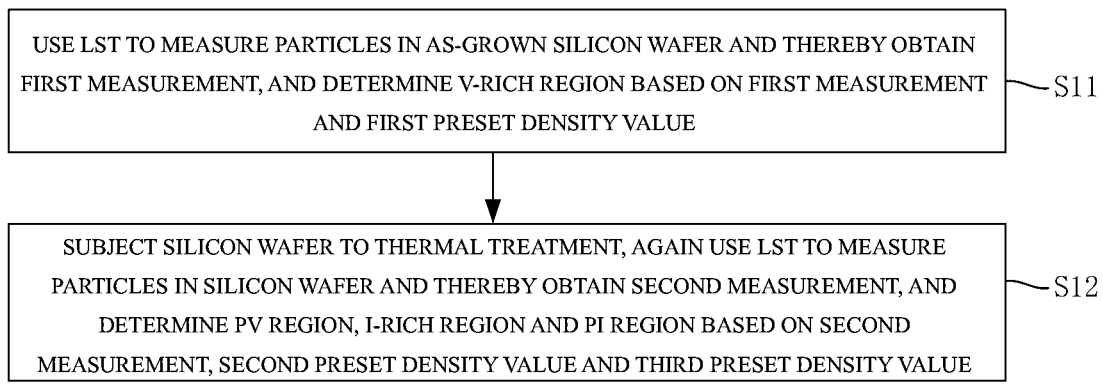
FIG. 1 is a schematic flow diagram of a method for determining the type of defects in a monocrystalline silicon wafer according to Embodiment 1 of the present invention.

FIG. 1 is a schematic flow diagram of a method for determining the type of defects in a monocrystalline silicon wafer according to the present embodiment of the present invention. As shown in FIG. 1, the method includes:

Step S11, using laser scattering tomography (LST) to measure particles in an as-grown silicon wafer and thereby obtaining a first measurement, and determining a V-rich region based on the first measurement and a first preset density value; and Step S12, subjecting the silicon wafer to a thermal treatment, again using LST to measure particles in the silicon wafer and thereby obtaining a second measurement, and determining a Pv region, an I-rich region and a Pi region based on the second measurement, a second preset density value and a third preset density value.

The method of determining the type of defects in a monocrystalline silicon wafer according to the present embodiment will be described in detail below.

At first, in step S11, LST is used to measure particles in an as-grown silicon wafer (i.e., a silicon wafer having not undergone any thermal treatment after it was sliced from a monocrystalline silicon ingot manufactured using the Czochralski method), and a first measurement is thus obtained. Moreover, a V-rich region is determined based on the first preset density value and the first measurement.

In particular, this step may include:

first of all, manufacturing a monocrystalline silicon ingot by performing a Czochralski process;

subsequently, axially slicing (i.e., longitudinally cutting) the monocrystalline silicon ingot;

after the longitudinal cutting, performing shaping and flattening processes and thereby obtaining the as-grown silicon wafer;

then using LST to measure particles in the as-grown silicon wafer and thereby obtaining the first measurement, wherein the first measurement includes a particle density, and the particles include void defects and non-void defects; and after that, determining the V-rich region based on the first preset density value and the first measurement. In particular, this may include, if the first measurement shows there is a measured region where the particle density is higher than the first preset density value, then determining the measured region as a V-rich region. The first preset density value may range from $2\times10^6$ $cm^{-3}$ to $1\times10^7$ $cm^{-3}$, for example $8\times10^6$ $cm^{-3}$.

Next, in step S12, a thermal treatment is conducted on the silicon wafer, and LST is again used to measure particles in the silicon wafer and a second measurement is thereby obtained. Moreover, defect regions are determined based on the second measurement, with a second preset density value and a third preset density value as threshold criteria. In this step, the second measurement allows making a clear determination and can be obtained with high robustness and high repeatability (i.e., reproducibility).

In particular, this step may include:

at first, subjecting the silicon wafer to a thermal treatment. The thermal treatment may be carried out to the silicon wafer having an oxygen content of 5 ppma to 20 ppma in an atmosphere such as but not limited to argon at a temperature of 800° C. to 1000° C. for 2 to 4 hours, for example at 950° C. for 3 hours. Compared with the thermal treatments involved in conventional bulk micro-defect (BMD) growth (for developing oxygen precipitates), which respectively involve heating at 800° C. for 4 h and heating at 1000° C. for 16 h, the thermal treatment in this embodiment involves growth of defects only to a size allowing detection and identification by LST, instead of sufficient growth of oxygen precipitates to a size allowing density measurement. That is, an improved thermal treatment scheme for BMD growth is provided, which can significantly reduce the time required for thermal pre-treatment of the silicon wafer and thereby reduce process cost.

Subsequently, LST is again used to measure particles in the silicon wafer and the second measurement is thereby obtained. The second measurement may include a particle density.

After that, a Pv regions, an I-rich region and a Pi region is determined based on the second measurement and on second and third preset density values.

Specifically, if the second measurement shows there is a measured region where the particle density is higher than the second preset density value, then the measured region may be determined as a Pv region. The second preset density value may range from $4\times10^6$ $cm^{-3}$ to $4\times10^7$ $cm^{-3}$, for example $8\times10^6$ $cm^{-3}$.

If the second measurement shows there is a measured region where the particle density lies between the second and third preset density values, then the measured region may be determined as an I-rich region. The third preset density value may range from $5\times10^5$ $cm^{-3}$ to $3\times10^6$ $cm^{-3}$, for example $1\times10^6$ $cm^{-3}$.

If the second measurement shows there is a measured region where the particle density is lower than the third preset density value, then the measured region may be determined as a Pi region.

The method will be exemplified with respect to its use in determining the types of defects in four silicon wafer samples (respectively referred to hereinafter as Samples 1, 2, 3 and 4).

Before being subjected to any thermal treatment, particles in central regions of the four silicon wafer samples are first measured by LST, and first measurements indicating their total particle densities are thus obtained respectively as $1.34\times10^7$ $cm^{-3}$, 0, 0 and $8.52\times10^5$ $cm^{-3}$. The particle density of Sample 1 is higher than the first preset density value ($8\times10^6$ $cm^{-3}$), which satisfies the criterion for determining a V-rich region. Therefore, the central region of Sample 1 is determined as a V-rich region. Since Sample 2, 3 and 4 do not satisfy this criterion, it is necessary to subject them to a thermal treatment and re-measure particles therein.

Next, particles in the Sample 2, 3 and 4 are again measured by LST, and second measurements indicating their total particle densities are thus obtained respectively as $8.72\times10^7$ $cm^{-3}$, $2.84\times10^5$ $cm^{-3}$ and $4.83\times10^6$ $cm^{-3}$. The particle density of Sample 2 is higher than the second preset density value ($8\times10^6$ $cm^{-3}$), which satisfies the criterion for determining a Pv region. Therefore, the central region of Sample 2 is determined as a Pv region. Moreover, the particle density of Sample 3 is lower than the third preset density value ($10^6$ $cm^{-3}$), which satisfies the criterion for determining a Pi region. Therefore, the central region of Sample 3 is determined as a Pi region. Further, the particle density of Sample 4 is between $1\times10^6$ $cm^{-3}$ and $8\times10^6$ $cm^{-3}$, which satisfies the criterion for determining an I-rich region. Therefore, the central region of Sample 4 is determined as an I-rich region.

These defect determination results of Samples 1, 2, 3 and 4 are verified against a method combining LLS and vapor etching, and it is found that the two methods have comparable outcomes.

Embodiment 2

Figure 2:
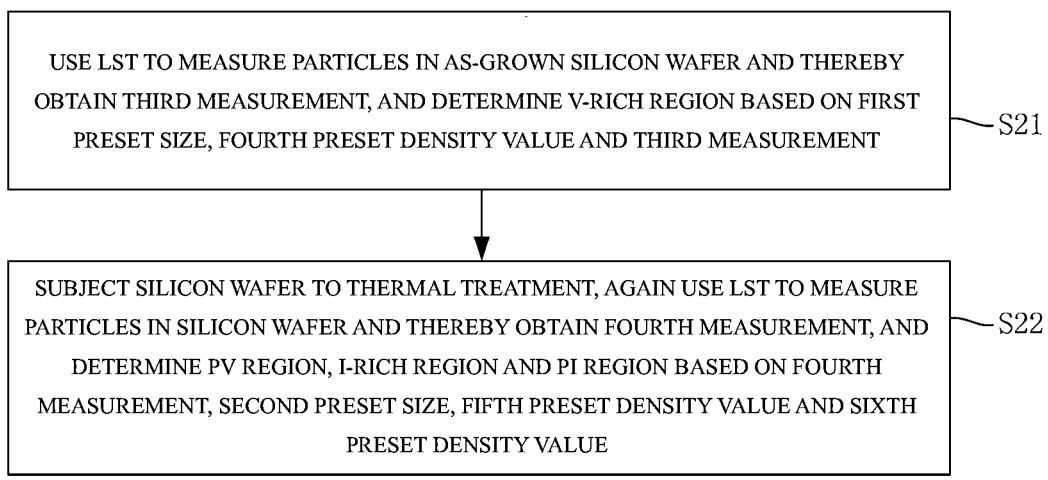
FIG. 2 is a schematic flow diagram of a method for determining the type of defects in a monocrystalline silicon wafer according to Embodiment 2 of the present invention.
Figure 3:
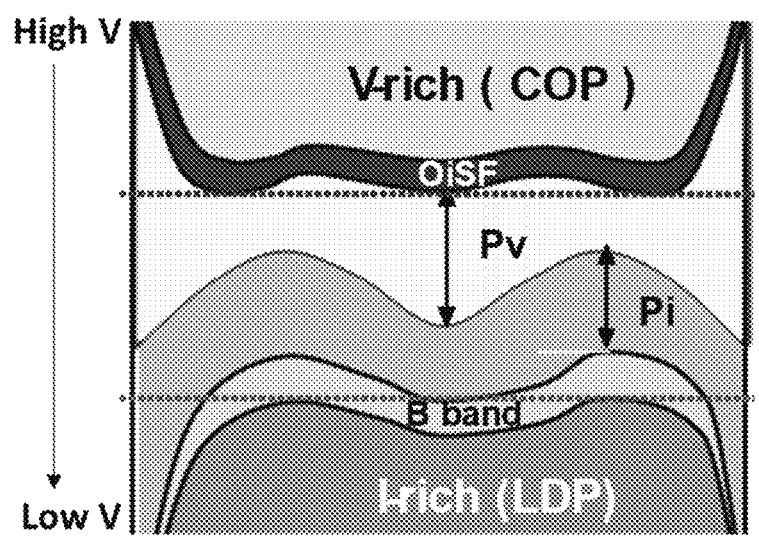
FIG. 3 is a schematic diagram showing the rates of pulling for V-rich, OISF, Pv, Pi and I-rich regions.

FIG. 2 is a schematic flow diagram of a method for determining the type of defects in a monocrystalline silicon wafer according to the present embodiment of the present invention. As shown in FIG. 2, the method includes:

Step S21, using LST to measure particles in an as-grown silicon wafer and thereby obtaining a third measurement, and determining a V-rich region based on a first preset size, a fourth preset density value and the third measurement; and Step S22, subjecting the silicon wafer to a thermal treatment, again using LST to measure particles in the silicon wafer and thereby obtaining a fourth measurement, and determining a Pv region, an I-rich region and a Pi region based on the fourth measurement, a second preset size, a fifth preset density value and a sixth preset density value.

The method of determining the type of defects in a monocrystalline silicon wafer according to the present embodiment will be described in detail below.

At first, in step S21, LST is used to measure particles in an as-grown silicon wafer, and a third measurement is thus obtained. Moreover, a V-rich region is determined based on a first preset size, a fourth preset density value and the third measurement.

In particular, this step may include:

first of all, using LST to measure particles in the as-grown silicon wafer and thereby obtaining the third measurement, wherein the third measurement includes a particle density and a particle size, and the particles include void defects and non-void defects; and after that, determining a V-rich region based on the first preset size, the fourth preset density value and the third measurement. In particular, if the third measurement shows there is a measured region where the particle density is higher than the fourth preset density value and the particle size is greater than the first preset size, then determining the measured region as a V-rich region. The first preset size is in the range of 20 nm to 25 nm, for example is 25 nm, which allows identification of larger particles with higher probability of containing void defects and can therefore result in increased measurement accuracy. The fourth preset density value may be in the range of $5 \times 10^5$ cm$^{-3}$ to $5 \times 10^6$ cm$^{-3}$, for example $1 \times 10^6$ cm$^{-3}$.

Next, in step S22, the silicon wafer is subjected to a thermal treatment, and LST is again used to measure particles in the silicon wafer and a fourth measurement is thereby obtained. Moreover, a Pv region, an I-rich region and a Pi region are determined based on the fourth measurement, a second preset size, a fifth preset density value and a sixth preset density value.

In particular, this step may include:

at first, subjecting the silicon wafer to a thermal treatment. The thermal treatment may be carried out to the silicon wafer having an oxygen content of 5 ppma to 20 ppma in an atmosphere such as but not limited to argon at a temperature of 800° ° C. to 1000° C. for 2 to 4 hours, for example at 950° C. for 3 hours. Compared with the thermal treatments involved in conventional BMD growth (for developing oxygen precipitates), which respectively involve heating at 800° ° C. for 4 h and heating at 1000° C. for 16 h, the thermal treatment in this embodiment involves growth of defects only to a size allowing detection and identification by LST, instead of sufficient growth of oxygen precipitates to a size allowing density measurement. That is, an improved thermal treatment scheme for BMD growth is provided, which can significantly reduce the time required for thermal pre-treatment of the silicon wafer and thereby reduce process cost.

Subsequently, LST is again used to measure particles in the silicon wafer and the fourth measurement is thereby obtained. The fourth measurement may also include a particle density and a particle size.

After that, a Pv region, an I-rich region and a Pi region are determined based on the fourth measurement, the second preset size, the fifth preset density value and the sixth preset density value.

Specifically, if the fourth measurement shows there is a measured region where the particle density is higher than the fifth preset density value, then the measured region is determined as a Pv region. The fifth preset density value may range from $4 \times 10^7$ cm$^{-3}$ to $1 \times 10^8$ cm$^{-3}$, for example $5 \times 10^7$ cm$^{-3}$.

If the fourth measurement shows there is a measured region where the particle density lies between the fifth and sixth preset density values and the particle size is greater than the second preset size, then the measured region is determined as an I-rich region. The sixth preset density value may range from 0 to $4 \times 10^6$ cm$^{-3}$, for example $10^6$ cm$^{-3}$. The second preset size may range from 30 nm to 40 nm, for example is 40 nm.

If the fourth measurement shows there is a measured region where the particle density is lower than the sixth preset density value and the particle size is greater than the second preset size, then the measured region is determined as a Pi region.

In this step, the measurement results may be plotted as a histogram of particle size versus number of particles, which can present critical information in a clear and intuitive fashion and enables calculation of the particle densities in the fourth and third measurements.

In summary, the present invention provides a method for determining the type of defects in a monocrystalline silicon wafer, in which an LST measurement is used in view of a particle density, or both a particle density and a particle size, as a basis for accurately and efficiently determining a region of interest of the monocrystalline silicon wafer as one of a V-rich region, a Pv region, a Pi region and an I-rich region, making the method advantageous in clear distinguishability, high robustness and high repeatability and thereby lowering the requirements imposed on the silicon wafer for region classification for defect assessment. Moreover, the combined use of a time-saving thermal treatment with LST can provide the advantage of efficient and less costly characterization of defects in a silicon wafer. In particular, the time-saving thermal treatment can significantly reduce the time required for thermally treating the silicon wafer and reduce process complexity and cost.

It is to be noted that, as used herein, the terms "first" and "second" are only meant to distinguish various components, elements, steps, etc. from each other rather than indicate logical or sequential orderings thereof, unless otherwise indicated or specified.

It is to be understood that while the invention has been described above with reference to preferred embodiments thereof, it is not limited to these embodiments. In light of the above teachings, any person familiar with the art may make many possible modifications and variations to the disclosed embodiments or adapt them into equivalent embodiments, without departing from the scope of the invention. Accordingly, it is intended that any and all simple variations, equivalent changes and modifications made to the foregoing embodiments based on the substantive disclosure of the invention without departing from the scope thereof fall within this scope.

What is claimed is:

1. A method for determining the type of defects in a monocrystalline silicon wafer, comprising steps of:
   measuring particles in an as-grown silicon wafer by using laser scattering tomography to obtain a first measurement, and determining a V-rich region based on the first measurement and a first preset density value; and
   subjecting the silicon wafer to a thermal treatment, measuring particles in the silicon wafer by using laser scattering tomography again to obtain a second measurement, and determining a Pv region, an I-rich region and a Pi region based on the second measurement, a second preset density value and a third preset density value.

2. The method of claim 1, wherein the first measurement comprises a particle density, and wherein determining the V-rich region based on the first measurement and the first preset density value comprises:
   determining a region, for which the particle density of the first measurement is higher than the first preset density value, as the V-rich region.

3. The method of claim 1, wherein the silicon wafer has an oxygen content of 5 ppma to 20 ppma, and the thermal treatment that the silicon wafer is subjected to is performed in an argon atmosphere at a temperature of 800° C. to 1000° C. for 2 hours to 4 hours.

4. The method of claim 1, wherein the second measurement comprises a particle density, and wherein determining the Pv region, the I-rich region and the Pi region based on the second measurement, the second preset density value and the third preset density value comprises:
   determining a region, for which the particle density of the second measurement is higher than the second preset density value, as the Pv region;
   determining a region, for which the particle density of the second measurement lies between the second and third preset density values, as the I-rich region; and
   determining a region, for which the particle density of the second measurement is lower than the third preset density value, as the Pi region.

5. The method of claim 1, wherein the first preset density value is in a range of $2\times10^6$ cm$^{-3}$ to $10^7$ cm$^{-3}$, the second preset density value is in a range of $4\times10^6$ cm$^{-3}$ to $4\times10^7$ cm$^{-3}$, and the third preset density value is in a range of $5\times10^5$ cm$^{-3}$ to $3\times10^6$ cm$^{-3}$.

6. A method for determining the type of defects in a monocrystalline silicon wafer, comprising steps of:
   measuring particles in an as-grown silicon wafer by using laser scattering tomography to obtain a third measurement, and determining a V-rich region based on a first preset size, a fourth preset density value and the third measurement; and
   subjecting the silicon wafer to a thermal treatment, measuring particles in the silicon wafer by using laser scattering tomography again to obtain a fourth measurement, and determining a Pv region, an I-rich region and a Pi region based on the fourth measurement, a second preset size, a fifth preset density value and a sixth preset density value.

7. The method of claim 6, wherein the third measurement comprises a particle density and a particle size, and wherein determining the V-rich region based on the first preset size, the fourth preset density value and the third measurement comprises:
   determining a region, for which the particle density of the third measurement is higher than the fourth preset density value and the particle size of the third measurement is greater than the first preset size, as the V-rich region.

8. The method of claim 6, wherein the silicon wafer has an oxygen content of 5 ppma to 20 ppma, and the thermal treatment that the silicon wafer is subjected to is performed in an argon atmosphere at a temperature of 800° C. to 1000° C. for 2 hours to 4 hours.

9. The method of claim 6, wherein the fourth measurement comprises a particle density and a particle size, and wherein determining the Pv region, the I-rich region and the Pi region based on the fourth measurement, the second preset size, the fifth preset density value and the sixth preset density value comprises:
   determining a region, for which the particle density of the fourth measurement is higher than the fifth preset density value, as the Pv region;
   determining a region, for which the particle density of the fourth measurement lies between the fifth and sixth preset density values and the particle size of the fourth measurement is greater than the second preset size, as the I-rich region; and
   determining a region, for which the particle density of the fourth measurement is lower than the sixth preset density value and the particle size of the fourth measurement is greater than the second preset size, as the Pi region.

10. The method of claim 6, wherein the first preset size ranges from 20 nm to 25 nm, the second preset size ranges from 30 nm to 40 nm, the fourth preset density value ranges from $5\times10^5$ cm$^{-3}$ to $5\times10^6$ cm$^{-3}$, the fifth preset density value ranges from $4\times10^7$ cm$^{-3}$ to $10^8$ cm$^{-3}$, and the sixth preset density value ranges from 0 to $4\times10^6$ cm$^{-3}$.

* * * * *